United States Patent
Fochtman et al.

(10) Patent No.: US 11,105,437 B2
(45) Date of Patent: Aug. 31, 2021

(54) COMBINED INLET AND OUTLET CHECK VALVE SEAT

(71) Applicant: Continental Automotive Systems, Inc., Auburn Hills, MI (US)

(72) Inventors: James Fochtman, Williamsburg, VA (US); John Walters, Williamsburg, VA (US); Tyler Craven, Norfolk, VA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 5 days.

(21) Appl. No.: 16/023,988

(22) Filed: Jun. 29, 2018

(65) Prior Publication Data

US 2019/0003598 A1 Jan. 3, 2019

Related U.S. Application Data

(60) Provisional application No. 62/528,348, filed on Jul. 3, 2017, provisional application No. 62/528,345, filed (Continued)

(51) Int. Cl.
*F16K 31/06* (2006.01)
*F04B 53/10* (2006.01)
(Continued)

(52) U.S. Cl.
CPC ......... *F16K 31/0686* (2013.01); *F02M 37/08* (2013.01); *F02M 37/10* (2013.01);
(Continued)

(58) Field of Classification Search
CPC ..... Y10T 137/88054; Y10T 137/88062; Y10T 137/778; F16F 9/348; F16F 9/3485; F16F 9/3488; F16K 17/18
(Continued)

(56) References Cited

U.S. PATENT DOCUMENTS 2,971,531 A * 2/1961 Jurs ........................ F16K 17/194
137/493.9
3,613,718 A * 10/1971 Ballinger .............. F16K 17/196
137/493
(Continued)

FOREIGN PATENT DOCUMENTS

CN 102506201 A 6/2012
CN 103857899 A 6/2014
(Continued)

OTHER PUBLICATIONS

Machine Translation of DE1809954 retrieved from espacenet.com on Mar. 2020. (Year: 2020).*

(Continued)

*Primary Examiner* — Jessica Cahill

(57) ABSTRACT

A valve assembly for a fluid pump includes a valve body; an inlet disk movably disposed in the valve body; an outlet disk movably disposed in the valve body; and a valve seat fixed within the valve body. The valve seat includes a first aperture defined axially through the valve seat in a radial central portion thereof, and one or more second apertures disposed at least partly around the first aperture. The inlet disk is biased in a closed position against the valve seat along a first surface thereof, the closed position of the inlet disk covering the one or more second apertures of the valve seat. The outlet disk is biased in a closed position against the valve seat along a second surface thereof.

23 Claims, 8 Drawing Sheets

Related U.S. Application Data on Jul. 3, 2017, provisional application No. 62/528,351, filed on Jul. 3, 2017, provisional application No. 62/528,356, filed on Jul. 3, 2017, provisional application No. 62/528,412, filed on Jul. 3, 2017, provisional application No. 62/528,417, filed on Jul. 3, 2017.

(51) Int. Cl.

| | |
|---|---|
| *F02M 37/10* | (2006.01) |
| *H01F 7/08* | (2006.01) |
| *H01F 7/16* | (2006.01) |
| *F02M 59/46* | (2006.01) |
| *F02M 51/04* | (2006.01) |
| *F02M 63/00* | (2006.01) |
| *F02M 37/08* | (2006.01) |
| *F02M 59/10* | (2006.01) |
| *F04B 23/02* | (2006.01) |
| *F02M 55/00* | (2006.01) |
| *F04B 39/10* | (2006.01) |
| *F16K 1/42* | (2006.01) |
| *F16K 15/02* | (2006.01) |
| *F16K 27/02* | (2006.01) |
| *F04B 17/04* | (2006.01) |
| *F16K 15/14* | (2006.01) |
| *F02M 51/06* | (2006.01) |
| *F02M 59/36* | (2006.01) |
| *B21D 39/06* | (2006.01) |
| *F02M 37/54* | (2019.01) |
| *F02D 41/30* | (2006.01) |
| *F02M 37/04* | (2006.01) |

(52) U.S. Cl.
CPC ........ *F02M 51/04* (2013.01); *F02M 51/0614* (2013.01); *F02M 55/007* (2013.01); *F02M 59/10* (2013.01); *F02M 59/367* (2013.01); *F02M 59/462* (2013.01); *F02M 59/464* (2013.01); *F02M 59/466* (2013.01); *F02M 63/0019* (2013.01); *F02M 63/0078* (2013.01); *F04B 17/04* (2013.01); *F04B 23/021* (2013.01); *F04B 39/1046* (2013.01); *F04B 53/10* (2013.01); *F04B 53/103* (2013.01); *F04B 53/109* (2013.01); *F04B 53/1032* (2013.01); *F04B 53/1035* (2013.01); *F04B 53/1087* (2013.01); *F16K 1/42* (2013.01); *F16K 15/02* (2013.01); *F16K 15/028* (2013.01); *F16K 15/14* (2013.01); *F16K 27/0209* (2013.01); *F16K 31/0689* (2013.01); *H01F 7/081* (2013.01); *H01F 7/1607* (2013.01); *B21D 39/06* (2013.01); *F02D 41/3082* (2013.01); *F02M 37/043* (2013.01); *F02M 37/54* (2019.01); *F02M 2200/8053* (2013.01)

(58) Field of Classification Search
USPC ............................................ 137/493.8, 493.9
See application file for complete search history.

(56) References Cited

U.S. PATENT DOCUMENTS

| | | | | |
|---|---|---|---|---|
| 3,625,248 A * | 12/1971 | Lhotellier | ............... | F16K 17/18 137/493.6 |
| 3,874,487 A * | 4/1975 | Keijzer | ............... | F16F 9/348 188/322.14 |
| 4,240,434 A | 12/1980 | Newkirk | | |
| 4,624,347 A * | 11/1986 | Mourray | ............... | F16F 9/348 137/493.9 |
| 4,747,475 A * | 5/1988 | Hagwood | ............... | F16F 9/348 137/493.9 |
| 4,782,925 A * | 11/1988 | Grundei | ............... | F16F 9/585 188/322.14 |
| 4,917,181 A * | 4/1990 | Kiernan, Jr. | ............ | F28D 9/0012 165/166 |
| 4,934,907 A | 6/1990 | Kroner | | |
| 4,971,181 A * | 11/1990 | Zaenglein | ............ | F16F 9/3271 137/543.17 |
| 5,022,832 A * | 6/1991 | Lauterbach | ......... | F04B 39/1033 137/516.15 |
| 5,413,195 A * | 5/1995 | Murakami | ............ | F16F 9/3484 188/282.6 |
| 5,727,594 A | 3/1998 | Choksi | | |
| 5,813,500 A * | 9/1998 | Deferme | ............... | F16F 9/341 188/282.8 |
| 5,881,759 A * | 3/1999 | Andersson | ............ | E03C 1/122 137/246 |
| 6,240,962 B1 | 6/2001 | Tai et al. | | |
| 6,276,498 B1 * | 8/2001 | Kirchner | ............... | F16F 9/3405 188/280 |
| 6,382,372 B1 * | 5/2002 | Keil | ....................... | F16F 9/348 188/322.14 |
| 6,390,130 B1 | 5/2002 | Guala | | |
| 6,401,749 B1 | 6/2002 | Tai et al. | | |
| 6,405,750 B1 * | 6/2002 | Rogala | ................ | B60G 17/0152 137/493.8 |
| 7,096,883 B2 * | 8/2006 | Gessat | ..................... | F16K 17/18 137/493.8 |
| 8,016,088 B2 * | 9/2011 | Morita | ................... | F16F 9/3481 188/282.6 |
| 8,528,591 B2 | 9/2013 | Pirk et al. | | |
| 8,794,265 B2 * | 8/2014 | Handke | ................. | F16F 9/3485 137/493.8 |
| 8,955,654 B2 * | 2/2015 | Nygren | ................. | F16F 9/3485 188/322.15 |
| 9,033,123 B2 * | 5/2015 | Kobayashi | ........... | F16F 9/3405 188/282.6 |
| 9,121,524 B2 * | 9/2015 | Ashiba | ................. | F16F 9/3485 |
| 9,188,117 B2 * | 11/2015 | Ito | ....................... | F04B 39/1073 |
| 10,082,088 B2 | 9/2018 | Marocchini et al. | | |
| 10,393,208 B2 * | 8/2019 | Knezevic | ............. | F16F 9/3484 |
| 2002/0176786 A1 | 11/2002 | Hirose et al. | | |
| 2004/0182446 A1 | 9/2004 | Semeia | | |
| 2005/0051395 A1 * | 3/2005 | Deferme | ................ | F16F 9/348 188/282.5 |
| 2012/0085323 A1 | 4/2012 | Allen et al. | | |
| 2013/0061939 A1 | 3/2013 | Leppert et al. | | |
| 2013/0062440 A1 | 3/2013 | Czimmek | | |
| 2014/0217318 A1 * | 8/2014 | Schlick | ............... | F16K 31/0658 251/129.15 |
| 2015/0034437 A1 * | 2/2015 | Yamada | ................. | F16F 9/3214 188/322.15 |
| 2016/0237973 A1 | 8/2016 | Bleeck et al. | | |
| 2017/0120321 A1 | 5/2017 | Teramoto et al. | | |
| 2017/0204930 A1 * | 7/2017 | Miwa | ....................... | F16F 9/34 |
| 2017/0268469 A1 | 9/2017 | Plisch et al. | | |
| 2017/0321643 A1 | 11/2017 | Krause et al. | | |
| 2018/0340589 A1 * | 11/2018 | Cheong | ................. | F16F 9/348 |
| 2019/0003603 A1 | 1/2019 | Craven et al. | | |
| 2019/0003605 A1 | 1/2019 | Craven et al. | | |

FOREIGN PATENT DOCUMENTS

| | | |
|---|---|---|
| DE | 1809954 U | 5/1970 |
| DE | 102011005487 A1 | 5/1970 |
| DE | 1911534 A | 9/1970 |
| DE | 102014208614 A1 | 11/2015 |
| JP | S57171 U | 1/1982 |

(56) References Cited

FOREIGN PATENT DOCUMENTS

JP          S595783 U     1/1984
WO    2012123131 A1   9/2012

OTHER PUBLICATIONS

Chinese First Office Action dated Aug. 12, 2019 for corresponding Chinese application No. 201810718453.6.
Indian Office Action dispatched dated Oct. 23, 2019 for corresponding Indian application No. 201814024811.
File history for U.S. Appl. No. 16/025,268, including final Office Action dated May 21, 2020.
Chinese Second Office Action dated Jul. 3, 2020 for corresponding Chinese application No. 201810718453.6.

\* cited by examiner

COMBINED INLET AND OUTLET CHECK VALVE SEAT

CROSS REFERENCE TO RELATED APPLICATIONS

The present application claims the benefit of the following provisional applications filed on Jul. 3, 2017: application No. 62/528,348, titled "Combined Inlet and Outlet Check Valve Seat"; application No. 62/528,345, titled "Asymmetric Spring Valve Disk"; application No. 62/528,356, titled "Hydraulic Damping of a Solenoid"; application No. 62/528,412, titled "Fuel Pump Valve Configuration and Assembly"; application No. 62/528,351, titled "Fuel Pump Solenoid Assembly Method"; and application No. 62/528,417, titled "Fuel Sending Unit Assembly and Operation." The content of these provisional patent applications are incorporated by reference herein in their entirety.

FIELD OF INVENTION

This invention relates to an inlet valve and an outlet valve for a fuel pump, and particularly to a valve seat for same.

BACKGROUND

A prior or existing check valve has a valve seat, and is the typical ball spring/needle spring check valve. It uses a spring and ball as the dynamic sealing element. This dynamic sealing element seals against a metallic valve seat whose geometry matches the dynamic sealing element to create a seal. This valve seat is a one way flow where a fluid's velocity would help to push against the ball which compresses the spring. The ball begins to lift off the valve seat and the flow of fluid starts. The fluid will flow through the valve seat hole or orifice and flow around the ball and past the spring that is applying the pressure to the ball. As long as fluid is flowing, the ball is lifted off the seat allowing flow until an equal pressure is reached on either side of the check valve. In summary, this type of check valve has one orifice that is sealing and offers only one direction of flow.

Since only one orifice/hole is used, a high velocity of liquid is needed to keep the valve open when the valve increases in size (to allow more flow in certain applications). When the valve increases in size in order to allow more flow, the orifice must be increased to allow more flow through the seat. This type of check valve has limited flow especially at high frequencies and high flow. When this orifice is increased, the ball size therefore must also be increased. When the ball size is increased, mass is increased as well which requires more fluid velocity to keep the ball open. The more massive the valve element the slower the valve response. The slower the response, the lower the maximum operating frequency of the valve. Durability is a concern with this typical design since each actuation of the check valve sends a heavy mass ball into the seat. After many actuations, wearing can be seen on the orifice along the sealing band. This wearing may sometimes increases the orifice size which lowers the possible velocity of the fluid across the check valve. Leading to a dynamic shift in performance which may negatively impact the device relying on the performance of the valve.

SUMMARY

According to an example embodiment, there is disclosed a valve assembly for a fluid pump, including a valve body; an inlet disk movably disposed in the valve body; an outlet disk movably disposed in the valve body; and a valve seat fixed within the valve body. The valve seat includes a first aperture defined axially through the valve seat in a radial central portion thereof, and one or more second apertures disposed at least partly around the first aperture. The inlet disk is biased in a closed position against the valve seat along a first surface thereof, the closed position of the inlet disk covering the one or more second apertures of the valve seat. The outlet disk is biased in a closed position against the valve seat along a second surface thereof.

The valve seat may include a groove defined along the first surface of the valve seat, each of the one or more second apertures is disposed in the groove. The inlet disk is disposed over and covers the groove when in the closed position. The groove may have an annular shape with a radial inner edge between the first aperture and the one or more second apertures.

In one aspect, the valve seat comprises a first seat ring extending from the second surface of the valve seat. The first seat ring is disposed between the first aperture and the one or more second apertures and forming the second surface of the valve seat. The outlet disk contacts the first seat ring when in the closed position. An outlet spring may be positioned within the valve body to bias the outlet disk against the first seat ring. The first seat ring may include a protrusion which extends in an axial direction further than other portions of the first seat ring, with the outlet disk contacting the protrusion when in the closed position.

The valve seat may further include a second seat ring extending from the second surface of the valve seat. The first seat ring and the second seat ring may be concentric with each other, and the second seat ring is positioned radially outwardly from the one or more second apertures. The first and second seat rings are constructed from a compressible, resilient material.

In another aspect, an inlet chamber defined at least in part in a space between the first and second seat rings, a pump chamber defined at least in part in the first aperture and a space within the first seat ring upstream of the outlet disk, and an outlet chamber defined downstream of a contact region between the first seat ring and the outlet disk.

The valve assembly may further include a stop wire disposed at least partly around and adjacent to the second seat ring. The stop wire is constructed from a noncompressible material and is sized so as to limit an amount of compression of the first and second seat rings.

In another example embodiment, a valve seat for a fluid pump valve assembly having an inlet valve and an outlet valve is disclosed. The valve seat includes a disk member having a first aperture defined axially through the disk member in a radial central portion thereof, and a plurality of second apertures disposed at least partly around the first aperture and defined axially through the disk member. The first aperture is configured to provide a fluid path to the outlet valve and the second apertures configured to provide a fluid path to the inlet valve.

In one aspect, an annular groove is defined along a surface of the disk member, the second apertures are disposed in the groove, and a radially inner edge of the groove is radially outwardly of the first aperture.

In another aspect, a first seat ring and a second seat ring are disposed along and extend from a surface of the disk member. The first and second seat rings are concentric. The first and second seat rings define at least part of an inlet chamber for fluid passing through the inlet valve, and the second ring defines at least part of an outlet chamber for fluid passing through the outlet valve.

The first seat ring is disposed radially outwardly of the second apertures and the second seat ring is disposed between the first aperture and the second apertures. The first and second seat rings are constructed from a resilient, compressible material.

In another aspect, the second seat ring includes a protrusion along an axially outer surface of the second seat ring such that the protrusion extends further from the disk member than other portions of the second seat ring, the protrusion defining a contact surface for the outlet valve. The protrusion is disposed along a radially inner portion of the second seat ring.

DETAILED DESCRIPTION

Example embodiments are generally directed to a valve group or valve assembly for a fuel pump which pumps fuel into a fuel line of an apparatus, such as a two or four wheeled vehicle, having a gasoline combustion engine. The fuel pump is configured to be submerged within the fuel tank of the vehicle or other apparatus of which the fuel pump is a part. The pump is controlled by an ECU of the apparatus. The valve group includes an inlet check valve and an outlet check valve which include a combined valve seat. The valve group is operatively connected to a solenoid power group or assembly to form the fuel pump.

The example embodiments are directed to the valve group of a fuel pump. The pump provides a filtered, metered by volume of fuel "sent" from the tank to the fuel line (not shown) at the proper pressure. This "sent" fuel keeps a fuel line at the proper pressure for the fuel injector (not shown) ported to the other end of the fuel line. This allows for the removal of the return line, inline filter and a pressure regulator. The pump is commanded by an electronic control unit (ECU) and generally runs synchronously with the timing of the fuel injector which is also controlled by the ECU (not shown), actuation to provide the fuel at the proper time.

It is understood that references to "upstream" and "downstream" herein are relative to the direction of fuel flow through the valve group pump.

Figure 1:
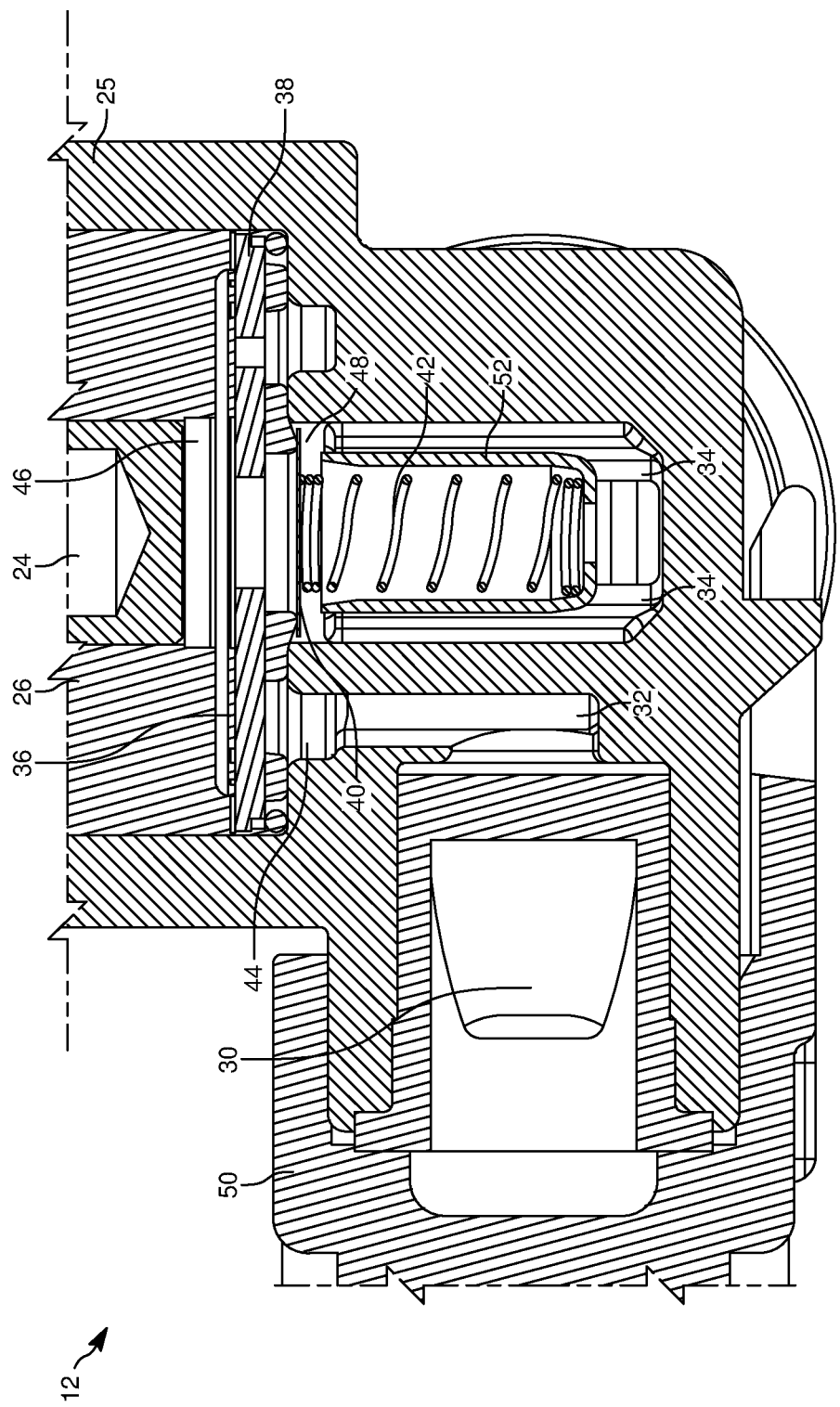
FIG. 1 is a cross sectional view of a portion of the valve group of the fuel pump according to an example embodiment.
Figure 2:
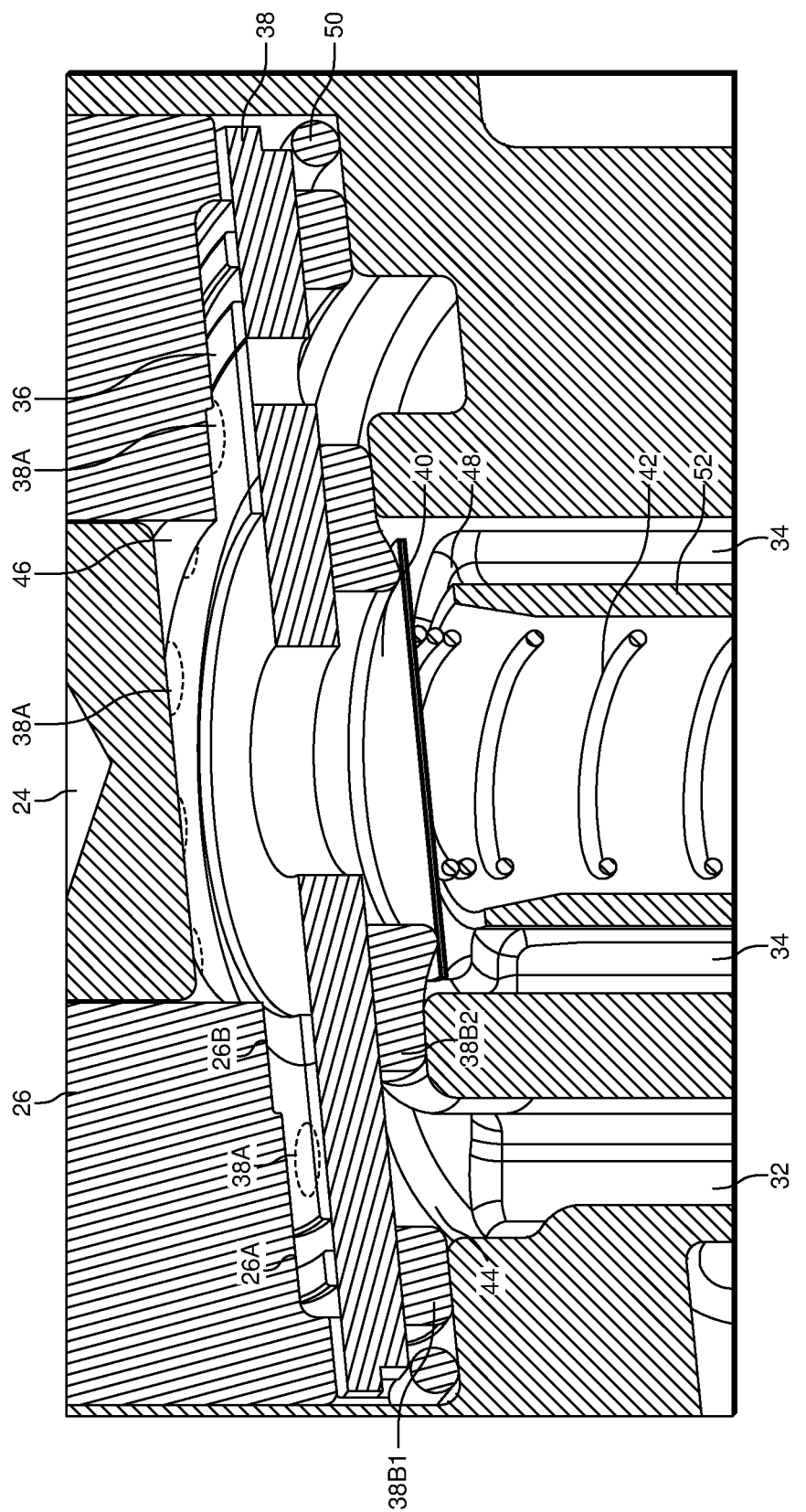
FIG. 2 is an expanded perspective view of the valve group portion of the fuel pump of FIG. 1.
Figure 3:
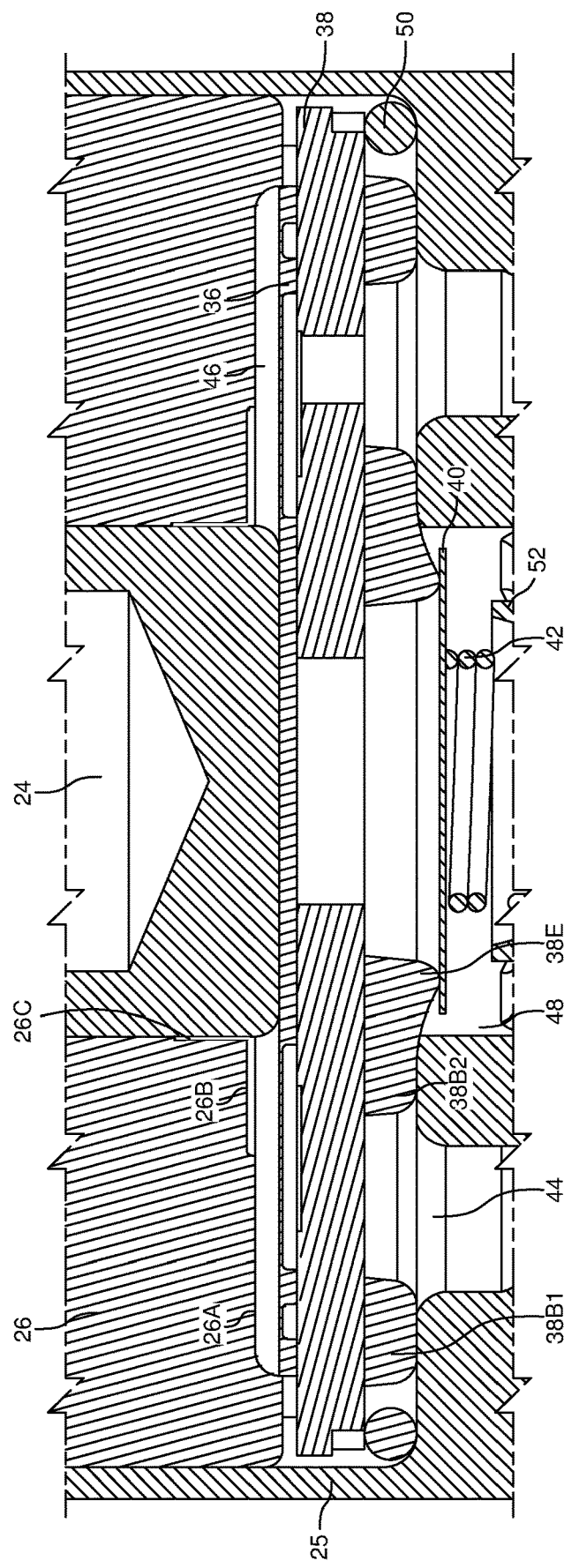
FIG. 3 is a cross sectional view of the valve group portion of the fuel pump of FIG. 1.

As shown in FIGS. 1-3, a valve group or assembly 12 includes a pump body 25, a bushing 26 at least partly disposed in pump body 25 and having a through-hole in which a plunger 24 is movably displaced, and a protection valve 30 disposed within the pump body 25. Plunger 24 is connected to an armature of the solenoid power group (not shown) so that the protection valve 30 is under control of the power group to which the valve group 12 is connected. Pump body 25 includes a fuel inlet passage 32 (FIG. 1) defined therein in which fluid which passes through the protection valve 30 flows. The pump body 25 further includes one or more fluid outlet passages 34 through which fuel passes prior to exiting the pump body 25. Disposed between the fuel inlet passage 32 and the fuel outlet passage 34 is an inlet disk 36, a valve seat 38 and an outlet disk 40. The valve seat 38 is fixedly disposed within the pump body 25. Best seen in FIGS. 2 and 3, a portion of the inlet disk 36 is movably disposed between the bushing 26 and the valve seat 38, and the outlet disk 40 is disposed downstream of the valve seat 38. An outlet spring 42 is disposed within the pump body 25 to bias the outlet disc 40 against the valve seat 38. The inlet disk 36 and the valve 38 seat serve as an inlet check valve of the valve group 12, and the outlet disk 40, outlet spring 42 and the valve seat 38 serve as the outlet check valve of the valve group 12.

Within the pump body 25 are a number of chambers for holding fuel. Referring to FIGS. 1-3, an inlet chamber 44 is formed at least partly within fuel inlet passage 32 upstream of inlet disk 36. A pump chamber 46 is defined at least partly within the through-hole of bushing 26 in which plunger 24 is disposed, and includes the space downstream of inlet disk 36 and upstream of outlet disk 40. An outlet chamber 48 is disposed downstream of outlet disk 40 and is at least partly defined within the fuel outlet passages 34.

The generally cylindrical plunger 24 is co-axially disposed with the longitudinal axis of the bushing 26. To reduce or minimize the volume of the pump chamber 46, the tip of the plunger 46 during certain portions of fuel pump operation is below the "stop" surface of the inlet disk 36 and is very close to the valve seat 38, while at other times, the plunger 46 is above such stop 26A of the bushing and within the tight clearance of the bushing 26 that mates with the plunger 24 to make a "seal" while operating. This seal is made by having a relatively small diametrical clearance gap (e.g., 5-15 microns) which is difficult for fuel to leak through during a compression stroke yet helps during priming of the fuel pump by allowing air in the pump chamber 46 to exit without requiring the air to pass into the fuel line.

Figure 4:
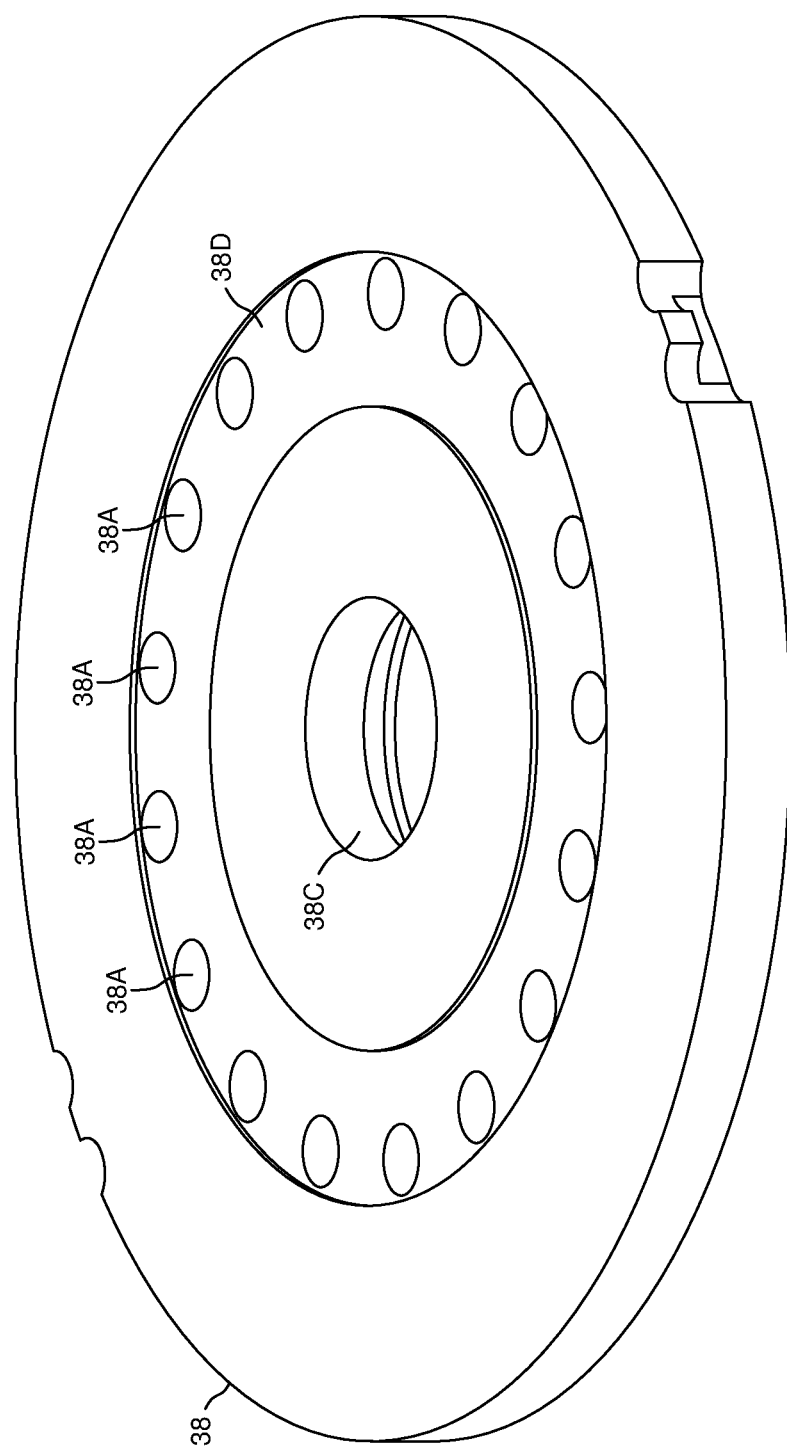
FIG. 4 is a perspective top view of the valve seat of the valve group of FIG. 1.
Figure 5:
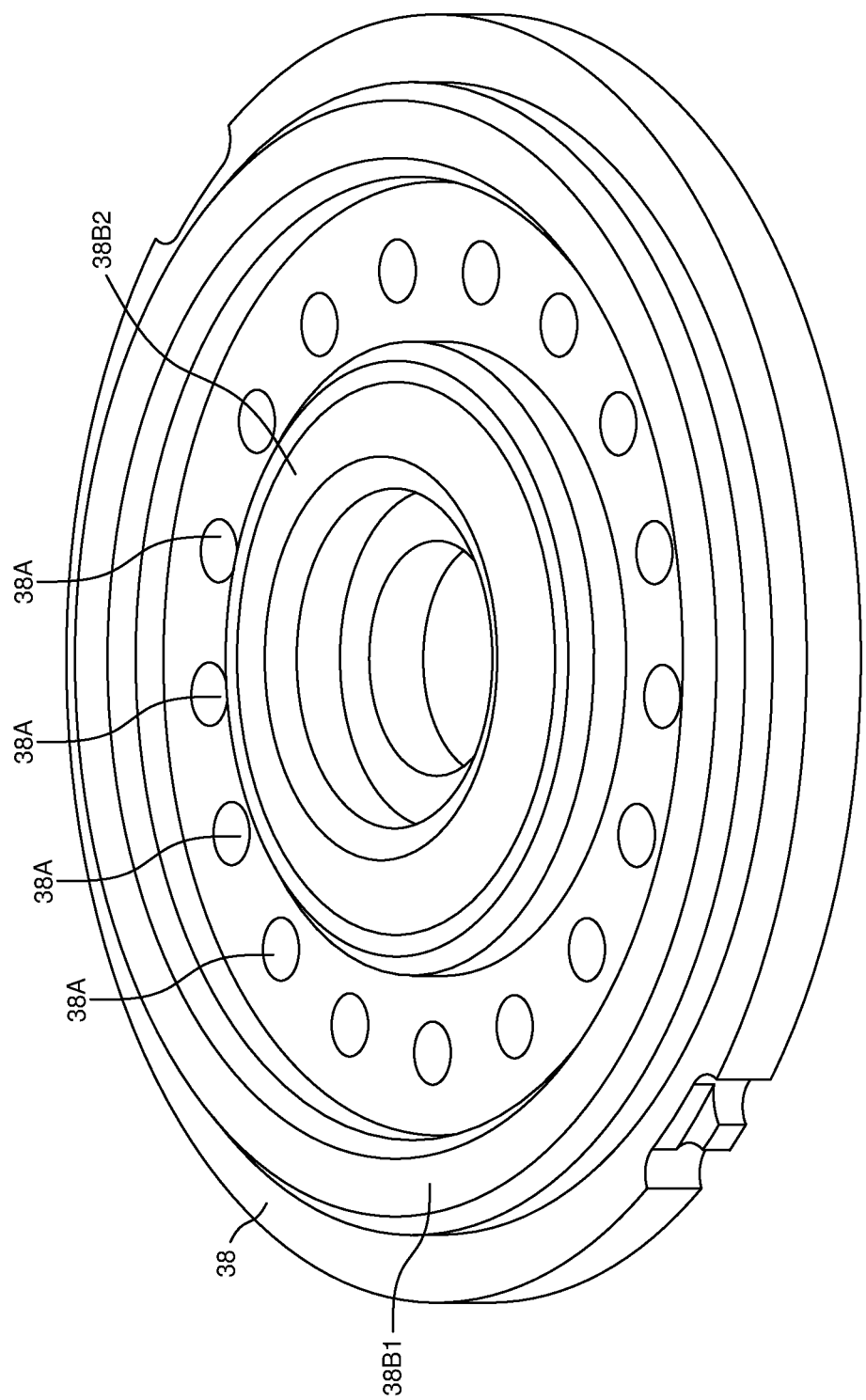
FIG. 5 is a perspective bottom view of the valve seat of the valve group of FIG. 1.

Best seen in FIGS. 4 and 5, the valve seat 38 is a disc or cylindrical shaped member constructed from metal, plastic or similarly rigid material. Valve seat 38 includes a plurality of apertures 38A defined axially or nearly axially through the seat. In the example embodiment illustrated, the apertures 38A surround a radial center of the valve seat 38, and are evenly distributed about the center. The number and size of apertures 38A may vary dependent upon the particular application of the valve group 12. At least one aperture 38A is disposed directly above the inlet chamber 44. Fuel passing from the inlet chamber 44 to the pump chamber 46 pass through the apertures 38A and urge a portion of the inlet disk 36 away from the valve seat 38, thereby opening the inlet check valve and forming a fuel path into the pump chamber 46. Apertures 38A surround an aperture 38C defined axially through a radial center of the valve seat 38. Aperture 38C has a larger diameter than the diameter of apertures 38A.

The valve seat 38 includes a relatively shallow groove 38D defined along the upper surface of the seat. A downstream end of each aperture 38A is located within the groove 38D. This groove 38D is at least the width of the apertures 38A, and runs or extends 360 degrees around the valve seat 38, ensuring each of the apertures 38A is within the groove 38D. The groove depth may vary but is generally not more than half of the thickness of the valve seat 38D itself.

Figure 6:
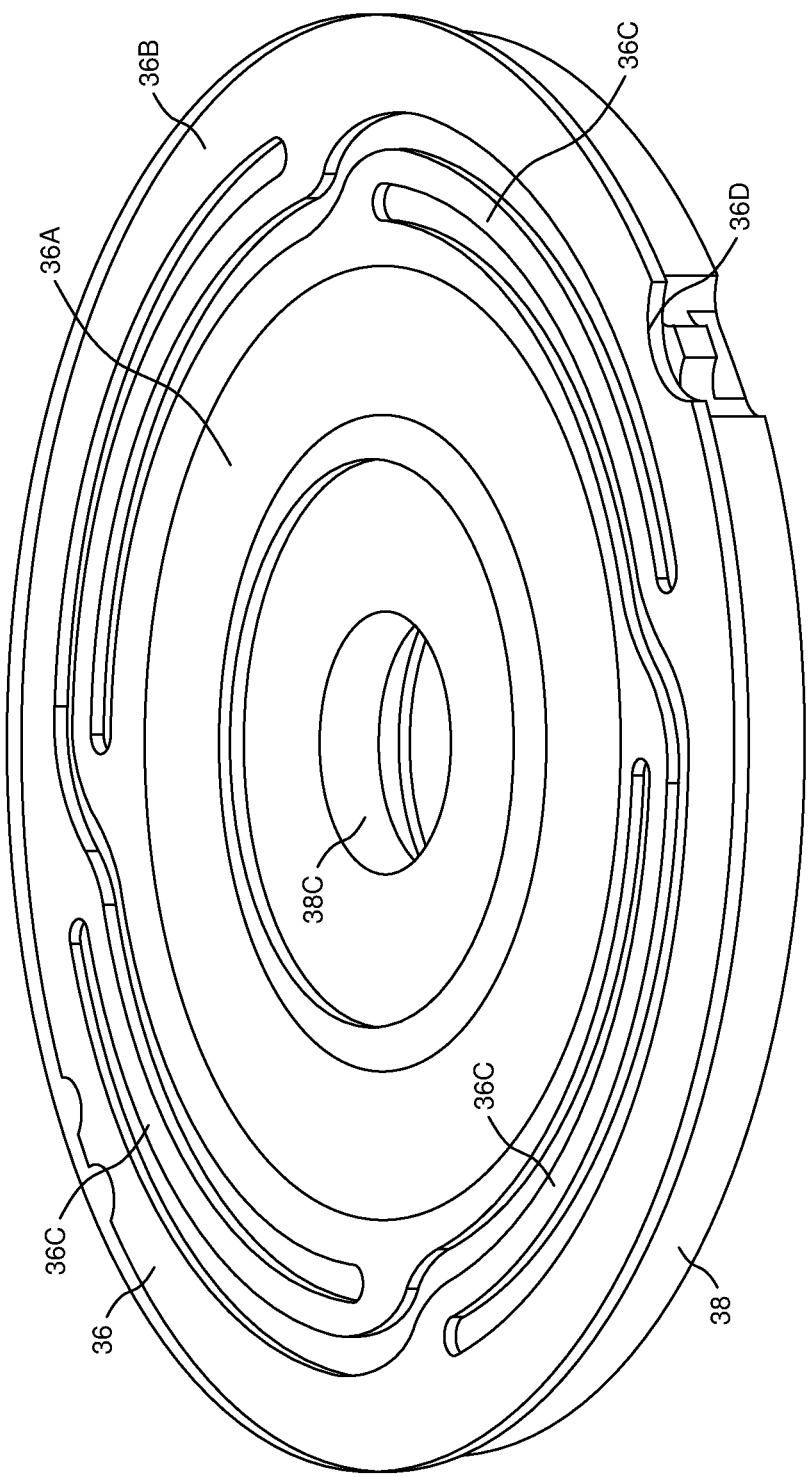
FIG. 6 is a perspective top view of the valve seat and inlet disk of the valve group of FIG. 1.

The top of the valve seat 38 is flat and/or planar and has a polished finish to aid in sealing since the inlet disk 36 contacts the polished area. As best shown in FIG. 6, the inlet disk 36 only covers up the radial outer portion of the top surface of the valve seat 38 and the apertures 38A along with the groove 38D. The radial center portion of the valve seat 38, where the aperture 38C is located, is not covered up by the inlet disk 36. The inlet interface between the valve seat 38 and the inlet disk 36 is metal-to-metal and both parts are flat and smooth in order to provide a seal. This inlet disk 36 seals with the valve seat 38 on either side of the groove 38D so a large amount of the inlet disk 36 does not actually touch the valve seat 38. The groove 38D allows reduced or minimal contact between the inlet disk 36 and the top of the valve seat 38, as well as allows the inlet fluid pressure to communicate to a significant area of the inlet disk 36 during operation of the valve group 12, as discussed in greater detail below. The space within the groove 38D and the space in the apertures 38A form part of the inlet chamber 44.

The bottom surface of the valve seat 38 has two radially separated but concentric, raised seat rings 38B molded onto and extending from the bottom surface, as shown in FIG. 5. The seat ring 38B1 is the radially outermost seat ring 38B which is bonded in between the outer diameter of the valve seat 38 and the bolt circle of apertures 38A. The seat ring 38B2 is bonded in between the center aperture 38C and the apertures 38A. This seat ring 38B has an extra protrusion or lip 38E (FIG. 3) added along the inner diameter of the ring so as to extend in an axial direction further away from the inlet disk 36 than the rest of the seat ring 38B2 and the seat ring 38B1. Along this protrusion 38E is where the flat, circular outlet disk 40 contacts the bottom of the valve seat 38. Best seen in FIGS. 2 and 3, the inlet chamber 44 is at least partly defined between the two seat rings 38B, and the pump chamber 46 is partly defined in the space in the center aperture 38C and the space within the inner seat ring 38B2. The rings 38 are constructed from a resilient, elastic and/or compressible material, such as rubber. Seat ring 38B2 provides a sealing surface for the outlet disk 40, and seat rings 38B1 and 38B2 provide sealing surfaces for a wall within the valve body 25 so as to at least partly define the inlet chamber 44 and the fuel inlet passage 32, as shown in FIGS. 2 and 3.

As mentioned, a portion of the inlet disk 36 is displaceable between the bushing 26 and the valve seat 38. As shown in FIGS. 2 and 3, the bushing 26 includes a stop 26A against which part of the inlet disk 36 contacts when the inlet disk 36 is separated from the valve seat 38 which allows fuel to pass from the inlet chamber 44 to the pump chamber 46. The bushing 26 also includes a step 26B which in the illustrated embodiment is disposed radially inwardly of the stop 26A so as to reduce the contact surface of the bushing 26 with the inlet disk 36, thereby providing easier separation thereof when the inlet disk 36 returns to its position against the valve seat 38.

Referring to FIG. 6, which depicts the inlet disk 36 and the valve seat 38 in a stacked arrangement, the inlet disk 36 includes a radially inner portion 36A and a radial outer portion 36B. In the example embodiment illustrated, the outer portion 36B is fixed within the valve body 25. Connected between the inner portion 36A and the outer portion 36B are a plurality of legs 36C. Legs 36C extend between the inner portion 36A and the outer portion 36B and are configured so as to serve as a spring for allowing the inner portion 36A to be lifted or otherwise elevated relative to the outer portion 36B. In the example embodiments, during energizing of the solenoid of the power group, to which the valve group 12 is operatively coupled, causes the plunger 24 to move away from the valve seat 38, thus increasing the size of the pump chamber 46 and creating a pressure differential between the inlet chamber 44 and the pump chamber 46. This pressure differential, when exceeding the bias force associated with the legs 36C, causes the inner portion 36A of the inlet disk 36 to separate from the valve seat 38 and move towards the bushing 26, thereby allowing fuel to pass through apertures 38A. Subsequently, when the solenoid is de-energized, the plunger 24 moves towards the valve seat 38 so as to decrease the size of the pump chamber 46 and increase the pressure therein, the inner portion 36A moves away from the bushing 26 and returns to its original position largely in the same plane as the outer portion 36B. In an example embodiment, one or more of the legs 36C is sized differently so as to provide an asymmetric spring in which a first section of the inner portion 36A is lifted away from the valve seat 38 prior to other sections of the inner portion 36A lifting from the valve seat 38, and another section of the inner portion 36A moves from the bushing 26 to the valve seat 38 prior to other sections of the inner portion 36A doing same. In an example embodiment, each leg 36C is configured differently from each of the other legs 36A.

Referring to FIGS. 1 and 2, the outlet spring 42 is housed in a spring retainer 52, which is shaped similarly to a cup. The inner surface of the outlet disk spring retainer 52 starts generally cylindrical in shape and then tapers radially inwardly at a distance above the bottom of the retainer. The taper of the inner surface helps to center the outlet spring 42 and keep the spring from being pinched, since the top of the outlet spring retainer 52 is also the valve stop of the outlet valve, which sets the stroke of the outlet disk 40. The wall thickness for the outlet spring retainer 52 is mostly constant, and the taper on the inside surface is similar on the outer surface too. This surface taper on the outside of the retainer 52 ensures a clean press fit into three ribs at the base of the valve body 25 in the fuel outlet passages 34.

Best seen in FIGS. 2 and 3, the valve group 12 further includes a stop wire 50, which is generally a ring shaped member constructed from uncompressible material, such as metal or a rigid plastic. The stop wire 50 is disposed in the valve body 25 at the radial outer end of the valve seat 38 such that the stop wire 50 is disposed adjacent to and is radially outside of the seat ring 38B1. A diameter of the stop wire 50 is sized similarly to the amount of axial extension of the seat ring 38B1, such as being having a diameter that is slightly less than such axial extension. With the stop wire 50 constructed from an uncompressible material, the stop wire 50 serves to limit the amount of compression of seat rings 38B1 and 38B2. Though the drawings depict the stop ring 50 as having a circular cross section, it is understood that the stop ring may have different cross sectional shapes.

Figure 8:
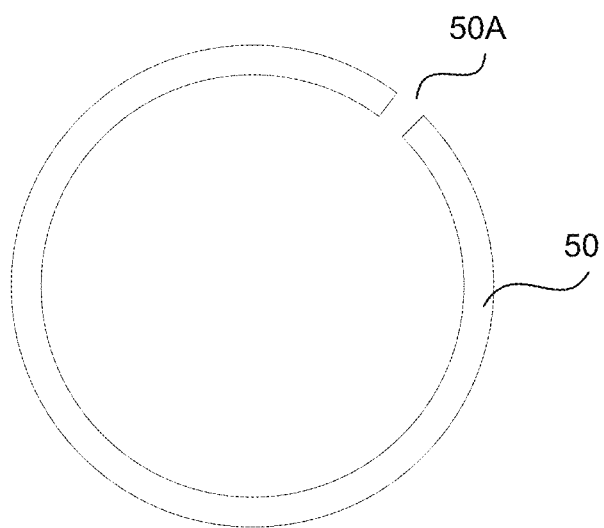
FIG. 8 is a top view of a stop wire of the valve group of FIG. 1.

As shown in FIG. 8, the stop wire 50 is largely ring shaped. In an example embodiment, the stop wire 50 includes a radial gap or space 50A such that the stop wire 50 has a semi annular or near annular shape. The stop wire 50 is disposed in the valve body 25 such that any trapped air bubbles in the valve body 25, such as in the fuel inlet passage 32, are able to pass through the gap 50A and enter the pump chamber 46 and ejected from the valve assembly, such as through the outlet chamber 48 and the fluid outlet passages 34, or through the clearance gap discussed above between the bushing 26 and the plunger 24.

During normal operation of the fuel pump, the solenoid power group is actuated by applying a current to the solenoid which builds a current-generated magnetic force that begins moving the armature of the power group to which the plunger 24 is connected. The plunger 46 moves away from the valve seat 38 which increases the size of the pump chamber 46 and lowers the pressure therein. The lower pressure in the pump chamber 46 creates a differential pressure across the inlet disk 36. The shallow groove 38D on the valve seat 38, which faces and is adjacent the inlet disk 36, allows for the pressure of the inlet chamber 44 to be communicated to a large surface area, increasing the differential pressure and helping the valve group 12 be resistant to viscosity-driven stiction which would slow the separation of the inlet disk 36 from the valve seat 38. Once the differential pressure across the inlet disk 36 exceeds the ability of the disk's internal spring (i.e., legs 36C) to hold the disk 36 against the seat 38 in the sealed or position of the inlet check valve, the inlet disk 36 will open with the inner portion 36A lifting from the valve seat 38. In particular, the differential pressure across the inlet disk 36 lifts the inner portion 36A of the inlet disk 36 at the least stiff location of the asymmetric spring formed by the legs 36C in order to trigger a peeling effect and improve the repeatability and shortening of the opening time of the inlet disk 36. To further take advantage of the asymmetry of the inlet disk 36, the radial location of the weakest/least stiff spot of the asymmetric spring portion on the disk is marked with a notch 36D. This notch 36D is used to orient the inlet disk 36 to align the least stiff part of the disk to be directly above the fuel inlet passage 32 feeding the inlet chamber 44. This allows for the fuel coming directly from the protection valve 30 to have a generally straight path through the flow apertures 38A on the valve seat 38 and impinge on the inlet disk 36, providing more separation of the inlet disk 36 which reduces the time required to fill the pump chamber 46. It may take the entire remainder of the cycle for the inlet chamber 44 to reach pressure stabilization with the fuel tank in which the fuel pump is disposed. The solenoid remains activated/energized for a short period of time following completion of the full stroke of the armature and the plunger 24 in order to allow the pump chamber 46 to fill completely. As the pressure of the pump chamber 46 approaches the pressure of the inlet chamber 44, the incoming fuel velocity decreases. When the momentum of the incoming fuel is reduced sufficiently, the inner portion 36A of the inlet disk 36 peels off from the stop 26A of bushing 26, which is stepped at step 26B to reduce the contact surface of the bushing 26 with the inlet disk 36, due to the asymmetric stiffness properties of the legs 36C of the inlet disk 36, and returns to the valve seat 38 which stops the incoming fuel flow into the pump chamber 46.

As the solenoid power group is de-energized and the magnetic field in the solenoid decays, the armature of the solenoid is pushed by a calibration spring and the resulting motion of the plunger 24 increases the pressure in the pump chamber 46. When the differential pressure between the pump chamber 46 and the outlet chamber 48 exceeds the load of the outlet valve spring 42, the outlet disk 40 separates from the protrusion 38E of the seat ring 38B2 on the valve seat 38 and the fuel flows from the pump chamber 46 into the outlet chamber 48. The fuel flow exiting the pump chamber 46 is turned 90 degrees before reaching the fuel outlet port which imparts momentum to the low mass outlet disk 40. Adding to the forces designed to move the outlet disk 40 to allow full flow in less than 1 millisecond, the fuel flow is pushed through a small annulus between the outer diameter of the outlet disk 40 and the walls of the valve body 25 to create a high velocity which takes advantage of the high drag coefficient of the thin, sharp edge outlet disk 40. This drag and transferred momentum leads to nearly digital (open/closed) motion of the outlet disk 40. As the outlet disk 40 is forced away from the valve seat ring 38B2, the forces are adding potential energy into the outlet spring 42. The fuel exiting the pump 100 passes through the three fuel outlet passages 34 (FIG. 1) on the way to the outlet port and into the fuel line. There is also a small hole at the base of the outlet spring retainer 52 which allows for the equalization of pressure inside and outside of the retainer while the outlet disk 40 is forced against the stop at the rim or top of the retainer 52. This equalization of the pressures reduces the separation time for the outlet disk 42 from the rim and/or outlet disk stop of the outlet spring retainer 52. The outlet disk stop also has a small contact area to reduce fluidic stiction between the outlet disk 40 and the stop to further improve separation time and consistency. As the fuel exits the outlet chamber 48, the plunger 24 approaches the valve seat 38.

Figure 7:
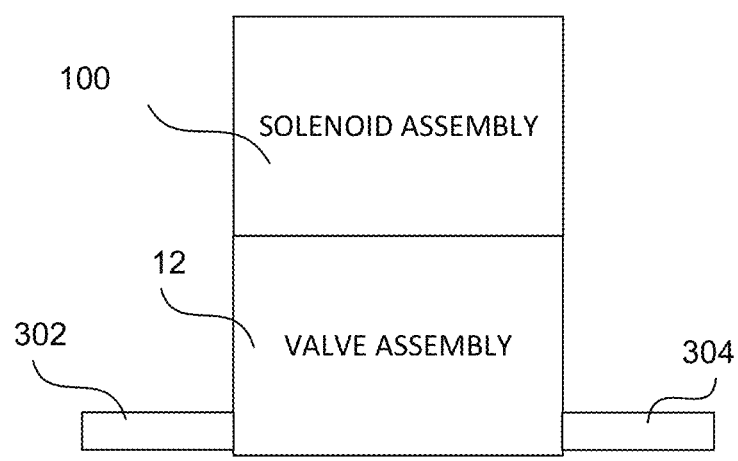
FIG. 7 is a diagram of a fuel pump having therein the valve group of FIG. 1.

FIG. 7 is a block diagram illustrating a fluid pump 10 having a solenoid power group or assembly 100 coupled to a valve group 12. In the illustrated example embodiment, the fluid pump 10 is a fuel pump but it is understood that the fluid pump 10 may be used to pump other fluids in other applications. The valve group 12 is operatively coupled to the solenoid power group 100 for pumping fuel from a fluid inlet 302 to a fluid outlet 304 of the valve group 12. The fluid outlet 304 is configured for connection to a fluid line (not shown) for supplying the fluid under pressure. An ECU (not shown) controls the solenoid power group 100 to move the armature therein in a reciprocating manner, which causes fuel to flow from the fluid inlet 302 to the pump chamber 46 via the inlet chamber 44 and the inlet valve, and to flow from the pump chamber 46 to the fluid outlet 302 via the outlet chamber 48 and the outlet valve, as described above. The particular features of the solenoid power group 100 and the fluid pump 10 may include the features described in the U.S. patent applications identified in the cross reference section above.

Example embodiment would be very useful in other fluid pumping applications that operate at high frequencies and work on the principle of positive displacement pumps using an inlet and outlet check style valves. The valve configuration described above allows for a very compact valve group 12 and fuel pump 100 with relatively small displacements for very high flows. Any pumping application where space is limited would be a good fit for the disclosed embodiments.

The valve seat 38 may be constructed from molded plastic with a secondary process of molding the seat rings 38 to the plastic. The valve seat 38 may be photoetched, with a secondary process of molded rubber sealing rings for the apertures 38A and/or 38C. The valve seat 38 may be stamped or coined, with a secondary process molded rubber to form the sealing rings.

The valve seat 38 may be raised or offset along the outside diameter of the top of the seat. This allows the inlet disc 36 to be clamped to the valve seat 38 at different heights.

The valve seat 38 may be made similarly to what was described above, but instead of having a metal-to-metal sealing interface on the inlet side of the seat, the rubber molding process may add rubber to the outer diameter of each aperture 38A of a given height. The flatness of the valve seat 38 does not need to be controlled tightly because the rubber rings around each aperture 38A may conform to easily seal against the inlet disk 36. While the sealing surface of the apertures 38A are raised, the inlet disk 36 may be still flush to the valve seat 38. This means that the inlet disc 36 is spring-loaded against the rubber inlet which gives the fuel pump 10 an inlet cracking pressure. This height may be adjusted in order to adjust the cracking pressure of the inlet disc to the desired number.

In certain situations or designs, a certain amount of leak through the inlet is required to be controlled. In this case, a secondary grinding process can be done to the top of valve seat. For instance, radial grooves starting from the direct center of the disc can be grinded onto the valve seat that extend towards the outside of the disc 360 degrees around the part. Depth of the grooves caused by grinding can be changed in order to minimize leak. This helps since your are controlling the leak in the direction intended across the sealing surfaces between the Inlet disc and valve seat.

The example embodiments have been described herein in an illustrative manner, and it is to be understood that the terminology which has been used is intended to be in the nature of words of description rather than of limitation. Obviously, many modifications and variations of the invention are possible in light of the above teachings. The description above is merely exemplary in nature and, thus, variations may be made thereto without departing from the spirit and scope of the invention as defined in the appended claims.

We claim:

1. A valve assembly for a fluid pump, the valve assembly comprising:
   a valve body;
   an inlet disk movably disposed in the valve body;
   an outlet disk movably disposed in the valve body; and
   a valve seat fixed within the valve body and comprising
      a disk having a first aperture defined axially through the disk in a radial center thereof such that openings of the first aperture along opposed sides of the disk are at the radial center of the disk, and one or more second apertures defined axially through the disk disposed at least partly around the first aperture, the valve seat comprises a first seat ring extending from a second surface of the disk of the valve seat, the first seat ring disposed between the first aperture and the one or more second apertures, the valve seat further comprises a second seat ring extending from the second surface of the disk of the valve seat, the first seat ring and the second seat ring are concentric with each other, and the second seat ring is positioned radially outwardly from the one or more second apertures; and
   an inlet chamber defined at least in part in a space between the first and second seat rings, a pump chamber defined at least in part in the first aperture and a space within the first seat ring upstream of the outlet disk, and an outlet chamber defined downstream of a contact region between the first seat ring and the outlet disk,
   wherein the inlet disk is biased in a closed position against the disk of the valve seat along a first surface of the valve seat, the closed position of the inlet disk covering the one or more second apertures of the valve seat, the inlet disk providing a seal with the valve seat when the inlet disk is in the closed position so as to prevent fluid flow between the inlet disk and the disk of the valve seat,
   wherein the outlet disk is biased in a closed position against the valve seat along the second surface thereof, and
   wherein the inlet chamber is fluidly isolated from the outlet chamber in the valve body when the inlet disk is in the closed position and the outlet disk is in an open position, and when the inlet disk is in the open position and the outlet disk is in the closed position.

2. The valve assembly of claim 1, wherein the valve seat includes a groove defined in the disk thereof along the first surface of the valve seat, each of the one or more second apertures is disposed in the groove.

3. The valve assembly of claim 2, wherein the inlet disk is disposed over and covers the groove when in the closed position.

4. The valve assembly of claim 3, wherein a depth of the groove from a radial inner edge to a radial outer edge is constant.

5. The valve assembly of claim 2, wherein the groove has an annular shape with a radial inner edge between the first aperture and the one or more second apertures.

6. The valve assembly of claim 1, wherein the outlet disk contacts the first seat ring when in the closed position.

7. The valve assembly of claim 6, further comprising an outlet spring positioned within the valve body to bias the outlet disk against the first seat ring.

8. The valve assembly of claim 6, wherein the first seat ring includes a protrusion which extends in an axial direction further than other portions of the first seat ring, the outlet disk contacting the protrusion when in the closed position.

9. The valve assembly of claim 1, wherein the first and second seat rings are constructed from a compressible, resilient material.

10. The valve assembly of claim 1, wherein the one or more second apertures are configured to provide a fluid path to the inlet disk.

11. The valve assembly of claim 1, wherein the disk of the valve seat has a thickness in a region between the first apertures and the one or more second apertures that is the same as the thickness of the disk of the valve seat in a region radially outwardly of the one or more second apertures.

12. A valve assembly for a fluid pump, the valve assembly comprising:
   a valve body;
   an inlet disk movably disposed in the valve body;
   an outlet disk movably disposed in the valve body;
   a valve seat fixed within the valve body and comprising
      a disk having a first aperture defined axially through the disk in a radial center thereof such that openings of the first aperture along opposed sides of the disk are at the radial center of the disk, and one or more second apertures defined axially through the disk disposed at least partly around the first aperture, wherein the valve seat comprises a first seat ring extending from a second surface of the disk of the valve seat, the first seat ring disposed between the first aperture and the one or more second apertures, wherein the valve seat further comprises a second seat ring extending from the second surface of the disk of the valve seat, the first seat ring and the second seat ring are concentric with each other, and the second seat ring is positioned radially outwardly from the one or more second apertures, and
   a stop wire disposed at least partly around and adjacent to the second seat ring, the stop wire is constructed from a noncompressible material and is sized so as to limit an amount of compression of the first and second seat rings,
   wherein the inlet disk is biased in a closed position against the disk of the valve seat along a first surface of the valve seat, the closed position of the inlet disk covering the one or more second apertures of the valve seat, the inlet disk providing a seal with the valve seat when the inlet disk is in the closed position so as to prevent fluid flow between the inlet disk and the disk of the valve seat, wherein the outlet disk is biased in a closed position against the valve seat along the second surface thereof, and wherein the first and second seat rings are constructed from a compressible, resilient material.

13. A valve seat for a valve assembly having an inlet valve and an outlet valve, the valve seat comprising:
a disk member having a first aperture defined axially through the disk member in a radial center thereof such that openings of the first aperture along opposed sides of the disk are at the radial center of the disk, and a plurality of second apertures disposed around the first aperture so as to surround the first aperture and defined axially through the disk member, the first aperture configured to provide a fluid path to the outlet valve and the second apertures configured to provide a fluid path to the inlet valve, the disk member including an annular groove defined along a first surface of the disk member, the second apertures disposed in the groove, a radially inner edge of the groove being radially outwardly of the first aperture, and a depth of the groove from a radial inner edge to a radial outer edge being constant,
wherein an axial length of the first aperture through the disk member is greater than an axial length of each second aperture through the disk member such that an opening of the first aperture along the first surface of the disk member extends in an axial direction farther than openings of the second apertures along the first surface.

14. The valve seat of claim 13, further comprising a first seat ring and a second seat ring disposed along and extending from a second surface of the disk member, the first and second seat rings being concentric, wherein the first and second seat rings define at least part of an inlet chamber for fluid passing through the inlet valve, and the second ring defines at least part of an outlet chamber for fluid passing through the outlet valve.

15. The valve seat of claim 14, wherein the first seat ring is disposed radially outwardly of the second apertures and the second seat ring is disposed between the first aperture and the second apertures.

16. The valve seat of claim 15, wherein the second seat ring includes a protrusion along an axially outer surface of the second seat ring such that the protrusion extends further from the disk member than other portions of the second seat ring, the protrusion defining a contact surface for the outlet valve.

17. The valve seat of claim 16, wherein the protrusion is disposed along a radially inner portion of the second seat ring.

18. The valve seat of claim 13, wherein the disk member has a thickness in a region between the first apertures and the plurality of second apertures that is the same as the thickness of the disk member in a region radially outwardly of the second apertures.

19. A valve seat for a valve assembly having an inlet valve and an outlet valve, the valve seat comprising:
a disk member having a first aperture defined axially through the disk member in a radial center thereof such that openings of the first aperture along opposed sides of the disk are at the radial center of the disk, and a plurality of second apertures disposed around the first aperture so as to surround the first aperture and defined axially through the disk member, the first aperture configured to provide a fluid path to the outlet valve and the second apertures configured to provide a fluid path to the inlet valve, the disk member including an annular groove defined along a first surface of the disk member, the second apertures disposed in the groove, a radially inner edge of the groove being radially outwardly of the first aperture, and a depth of the groove from a radial inner edge to a radial outer edge being constant, and
a first seat ring and a second seat ring disposed along and extending from a second surface of the disk member, the first and second seat rings being concentric, wherein the first and second seat rings define at least part of an inlet chamber for fluid passing through the inlet valve, and the second ring defines at least part of an outlet chamber for fluid passing through the outlet valve,
wherein the first and second seat rings are constructed from a resilient, compressible material and the disk member is constructed from a metal or plastic that is more rigid than the first and second seat rings.

20. The valve seat of claim 19, further comprising a stop wire disposed at least partly around and adjacent to the second seat ring, the stop wire is constructed from a non-compressible material and is sized so as to limit an amount of compression of the first and second seat rings.

21. The valve seat of claim 19, wherein the outlet valve comprises an outlet disk which selectively engages with the first seat ring, and wherein the inlet valve comprises an inlet disk which selectively engages with a second surface of the disk member.

22. A fuel pump valve assembly, comprising:
a valve body;
an inlet disk movably disposed in the valve body;
an outlet disk movably disposed in the valve body; and
a valve seat fixed within the valve body and comprising a first aperture defined axially through the disk in a radial central portion thereof, and one or more second apertures defined axially through the disk disposed at least partly around the first aperture,
wherein the inlet disk is biased in a closed position against the valve seat along a first surface thereof, the closed position of the inlet disk covering the one or more second apertures of the valve seat,
wherein the outlet disk is biased in a closed position against the valve seat along a second surface thereof,
wherein the valve seat comprises a first seat ring extending from the second surface of the valve seat, the first seat ring disposed between the first aperture and the one or more second apertures and forming the second surface of the valve seat,
wherein the valve seat further comprises a second seat ring extending from the second surface of the valve, the first seat ring and the second seat ring are concentric with each other, and the second seat ring is positioned radially outwardly from the one or more second apertures,
wherein the first and second seat rings are constructed from a compressible, resilient material, and
wherein the valve assembly further comprises a stop wire disposed at least partly around and adjacent to the second seat ring, the stop wire is constructed from a less compressible material relative to the compressible resilient material of the first and second seat rings, and is sized so as to limit an amount of compression of the first and second seat rings.

23. The fuel pump valve assembly of claim 22, wherein the stop wire has an annular shape with a gap defined therein, and the gap provides a path for trapped air bubbles disposed outside of the second seat ring to enter a pump chamber when the fuel pump is disposed in a fuel tank.

* * * * *